(12) United States Patent
Johnson et al.

(10) Patent No.: US 6,275,522 B1
(45) Date of Patent: Aug. 14, 2001

(54) METHOD FOR ALLOCATING DATA AND POWER IN A DISCRETE, MULTI-TONE COMMUNICATION SYSTEM

(75) Inventors: Terence Johnson; Michael R. May, both of Austin; Matthew A. Pendleton, Cedar Park; Howard E. Levin, Austin, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/007,390

(22) Filed: Jan. 14, 1998

(51) Int. Cl.[7] .............................. H04B 3/46; H04B 17/00; H04D 1/20
(52) U.S. Cl. ........................ 375/224; 370/252; 455/522
(58) Field of Search ........................ 375/222, 225, 375/227, 260, 295, 224, 228; 370/252, 484, 487, 494; 379/93.26, 93.28, 93.31, 33; 455/69, 67.3, 522

(56) References Cited

U.S. PATENT DOCUMENTS

| | | | |
|---|---|---|---|
| 4,328,581 | 5/1982 | Harmon et al. | 371/8 |
| 4,833,706 | 5/1989 | Hughes-Hartogs | 379/98 |
| 5,309,503 | 5/1994 | Bruckert et al. | 379/60 |
| 5,400,322 | 3/1995 | Hunt et al. | 370/19 |
| 5,475,864 | 12/1995 | Hamabe | 455/33.1 |
| 5,479,447 | 12/1995 | Chow et al. | 375/260 |
| 5,548,819 | 8/1996 | Robb | 455/59 |
| 5,596,604 | 1/1997 | Cioffi et al. | 345/260 |
| 5,598,435 | 1/1997 | Williams | 375/261 |
| 5,603,082 | 2/1997 | Hamabe | 455/33.1 |
| 5,790,514 | * 8/1998 | Marchok et al. | 370/208 |
| 5,790,550 | 8/1998 | Peeters et al. | 370/480 |
| 6,088,385 | * 7/2000 | Liu | 375/219 |
| 6,094,459 | * 7/2000 | Kao et al. | 375/295 |

OTHER PUBLICATIONS

Alliance for Tellecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.

Chow, et al., "A Practical Discrete Multitone Transceiver Loading Algorithm for Data Transmission over Spectrally Shaped Channels", IEEE Transactions on Communications, vol. 43, No. 2/3/4. pp. 773–775 (1995).

Cioffi, "DMT Information Bus for Multidrop Interface on Existing Wiring", T1E1.4/94–126, pp. 1–6 (1994).

* cited by examiner

*Primary Examiner*—Chi Pham
*Assistant Examiner*—Jean B. Corrielus
(74) *Attorney, Agent, or Firm*—Paul J. Polansky

(57) ABSTRACT

In the present invention, an ADSL system (10) identifies good bin as a bin capable of successfully transmitting data to a destination. A bad bin is identified as a carrier that is not capable of successfully transmitting data to the destination. A marginal bin is identified as a carrier that may be capable of transmitting data to the destination. The power to a bad bin is reduced and allocated to the marginal or good bin(s) to allow an increased bit rate. In another embodiment, the power to marginal bin is reduced and allocated to the good bin(s).

24 Claims, 5 Drawing Sheets

| SNR TABLE ||
| BITS | SNR$_{REF}$ |
| --- | --- |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

*FIG.2*

METHOD FOR ALLOCATING DATA AND POWER IN A DISCRETE, MULTI-TONE COMMUNICATION SYSTEM

CROSS-REFERENCE TO RELATED APPLICATIONS

A related application entitled "Method for Allocating Data in a Data Communication System," by Levin, and having Attorney Docket No. SC02954A and application Ser. No. 08/660,380, has been previously filed and has issued on Dec. 22, 1998 as U.S. Pat. No. 5,852,633.

A related application entitled "Method and Apparatus for Configuring a Communication System," by Levin, and having Attorney Docket No. SC90604A and application Ser. No. 08/937,759, has been previously filed now U.S. Pat. No. 6,130,882.

A related application entitled "Method For Fine Gains Adjustment In An ADSL Communications System" by Levin, and having Attorney Docket No. SC90011A and application Ser. No. 08/660,339, has been previously filed now abandoned.

A related application entitled "Method For Allocating Data And Power In A Discrete Multi-Tone Communication System" by Levin, and having Attorney Docket No. SC90669A and application Ser. No. 09/007,218 pending has been filed concurrently with the present application.

FIELD OF THE INVENTION

This invention relates generally to a communication system and more specifically to a method for improving data rate performance of a discrete multi-tone communication system.

BACKGROUND OF THE INVENTION

In order to make high data rate interactive services such as video conferencing and internet access available to more residential and small business customers, high speed data communication paths are required. Although fiber optic cable is the preferred transmission media for such high data rate services, it is not readily available in existing communications networks, and the expense of installing fiber optic cable is prohibitive. Current telephone wiring connections, which consist of twisted pair media, were not designed to support the high data rates required for interactive services such as video on demand or even high speed interconnects. In response, Asymmetrical Digital Subscriber Line (ADSL) technology has been developed to increase the transmission capabilities within the fixed bandwidth of existing twisted pair connections, allowing interactive services to be provided without requiring the installation of new fiber optic cable.

Discrete Multi-Tone (DMT) is a type of ADSL technology that uses a multi-carrier technique that divides the available bandwidth of a communications channel such as a twisted pair connection into a number of frequency sub-channels. These sub-channels are also referred to as frequency bins or carriers. A specific DMT technique has been adopted by the ANSI T1E1.4 (ADSL) committee. For purposes of discussion, the term "DMT" within this specification, will generally refer to the standard. DMT is used to generate 250 separate 4.3125 kHz sub-channels from 26 kHz to 1.1 MHz for downstream transmission to the end user, and 25 sub-channels from 26 kHz to 138 kHz for upstream transmission by the end user. Each bin is allocated a number of bits to send with each transmission. The number of bits allocated per bin in a DMT system are 0, and 2–15 bits.

Prior to transmitting real-time data with a DMT system, an initialization process occurs. During a first portion of the initialization process, an activation and acknowledgment step occurs. It is during this step that a transmit activation tone is generated following power-up of the ADSL system. Transceiver training is the next step of the initialization process. During transceiver training, the equalization filters of the ADSL system are trained and system synchronization is achieved. Next, channel analysis and exchange are performed as part of the initialization processes. During the channel analysis and exchange, the signal to noise ratio of the channels is determined, and bit loading configuration information for the bins, and other configuration information, is transferred between transceivers.

Subsequent to the initialization process, real-time data transmission begins. During real-time data transmission, the DMT standard specifies that a fixed amount of power be transmitted on each carrier. However, a disadvantage to assigning a fixed amount of power is that when there are unneeded carriers due to a low data rate, there is unnecessary power consumption associated with assigning a fixed amount of power to a carrier that is not transmitting any data. This additional power results in additional system costs. Another disadvantage is that a carrier's signal is attenuated as it is transmitted over greater distances. As a result, when the signal for a given carrier is attenuated to the point where data cannot be transmitted with a desired certainty, the capacity of the bin is set to zero, while its transmit power remains allocated to the now unused bin. This power on unused bins is an inefficient use of system power. Therefore, it would be beneficial to optimize power based upon the number of used bins, or optimizing a data rate for a fixed amount of power.

BRIEF DESCRIPTION OF THE DRAWINGS

The invention will be described with reference to the following figures:

FIG. 2, illustrates an SNR reference table;

DETAILED DESCRIPTION OF THE DRAWINGS

Figure 1:
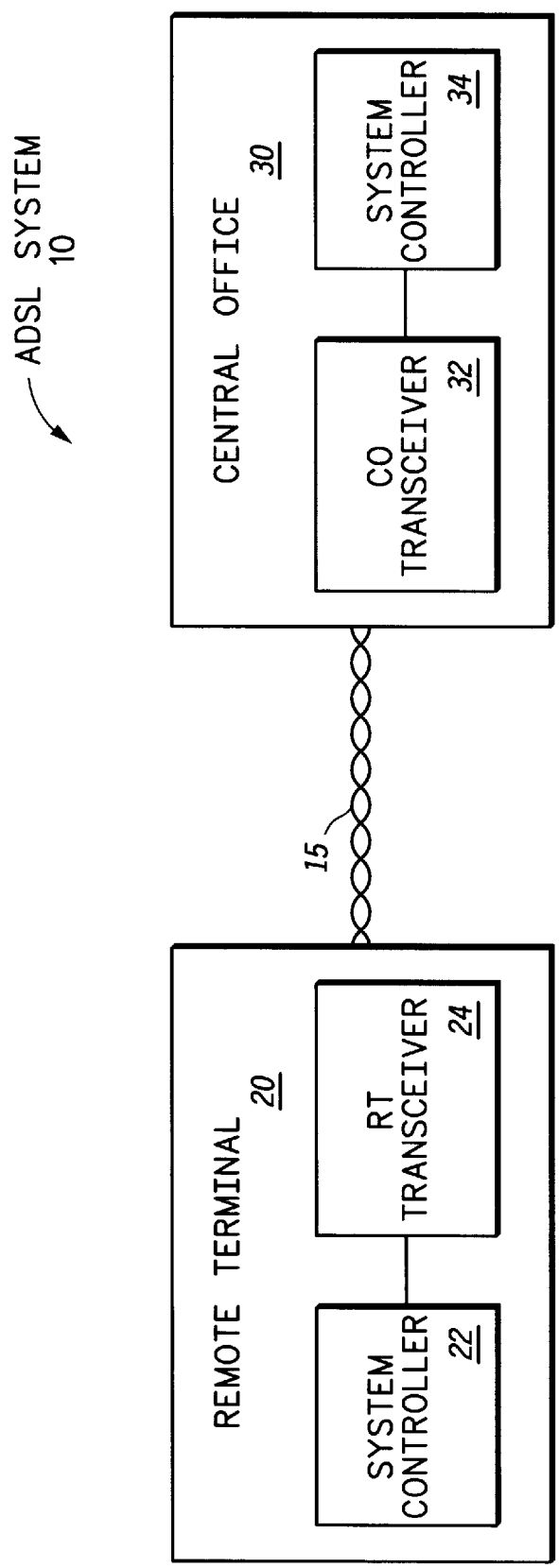
FIG. 1, illustrates an ADSL system in block form.

FIG. 1 illustrates an ADSL system 10. The ADSL system 10 comprises a remote terminal 20, and a central office 30 connected by a twisted pair transmission media 15. The remote terminal 20 and central office 30 each comprise a system controller 22 and 32, respectively. In addition, the remote terminal 20 and central office 30 each comprise a transceiver 24 and 32 respectively. Generally, the transceivers, 24 and 32 will contain processing units and memory associated with them for implementing firmware or software routines. However, these routines could also be implemented in hardware. The ADSL system 10 is capable of implementing the present invention. In operation, the central office 30 transmits downstream data across the transmission media 15 to the remote terminal 20. The data is received at the remote terminal 20 by the transceiver 24, which provides the received data to the system controller 22 for further processing. In a likewise fashion, the upstream data would be transmitted from the remote terminal 20, across the transmission media 15, and received by the central office transceiver 32, which provides the data to the system controller 34.

FIG. 2 illustrates a Signal-to-Noise Ratio (SNR) reference table for use within the ADSL system 10. The SNR reference table indicates an SNRref value, which is the SNR needed for a bin to transmit a specified number of bits at a specific Bit Error Rate (BER). For example, a bin which is determined to have an SNR of 30 would be able to transmit 7 bits of data. Also, for a specific bit error rate, the values of SNR reference table will vary depending upon the type of error correction used, if any. For example, the use of error correction could reduce each SNRref value in FIG. 2 by 3. This reduction would allow a bin having a SNR of 30 to transmit 8 bits.

Figure 3:
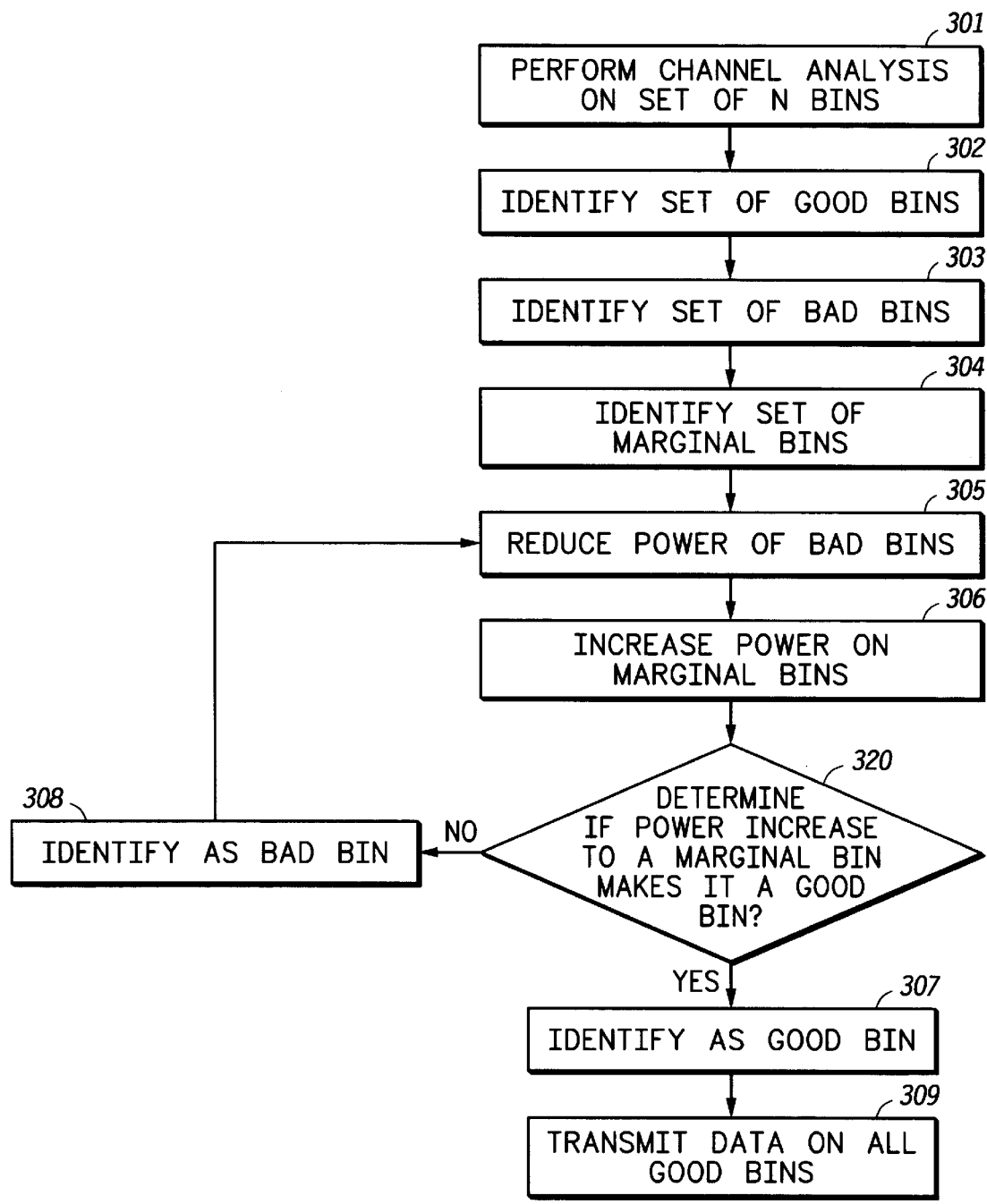
FIGS. 3–5, illustrates, in flow diagram form, a method for adjusting gain to a DMT system.

FIGS. 3–6 illustrate a method for implementing the present invention. While the specific embodiment will address a specific DMT implementation, it is to be understood that the present invention applies to any DMT system. At step 301 of FIG. 3, an analysis of an ADSL channel is performed. In one embodiment of the present invention, the channel analysis would return the SNR for a channel in an initial state. Generally, the channel analysis and steps of FIG. 3 are performed as part of the initialization process. However, other implementations where the steps of FIG. 3 are performed in real time are anticipated by the present invention.

Based upon the SNR value from the channel analysis step, it is determined at step 302 which bins associated with the channel are good bins. A good bin is defined to be a bin that meets a predefined SNR which is capable of transmitting a minimum amount of data. For example, the SNR reference (SNRref) values of table 2 indicates that in order to have two bits of data allocated to a bin, and maintain a specific BER, that the bin needs to have an SNR of at least 14. A channel having an SNR of less than 14 would indicate that the channel is not capable of sustaining the BER of the table while transmitting the minimum number of bits. Generally, a bin will be defined as a good bin if a minimum amount of data can be transmitted while meeting a predefined BER.

Next, at step 303, any bad bins within the channel are identified. A bad bin fails to meet a predefined performance criterion. In one embodiment, a specific carrier is identified as a bad bin if it is determined that no data can be transmitted within the predefined BER. Generally, this will be accomplished by comparing the SNR of a specific channel to the SNRref of the minimum amount of transmitted value and determining if a specified criterion is met. For example, the criterion may be that any carrier having a SNR minus SNRref of –5 or less is a bad bin. Therefore, given the table of FIG. 2, any channel having a SNR of 9 or less would be classified as a bad bin. Generally, a bad bin is not capable of having any data allocated to it.

Next, at step 304, a set of marginal bins is identified. The set of marginal bins is defined to be those bins that are not previously determined to be good bins or bad bins. Per the previous example, a marginal bin would have a SNR value between 9 and 14. This is because a carrier with an SNR of 14 or greater would be a good bin, and a carrier with an SNR of 9 or less would be a bad bin. Other definitions of marginal bins may be used as well, for example it may be desirable to define any bin not capable of carrying 5 bits as a marginal bin, or based on intervals between SNRref values.

Next, at step 305, the transmit power allocated to the bad bins is reduced. The power can be reduced by a fixed amount, or based upon a scale factor. An example of a bad bin having its transmit power reduced by a fixed amount would be changing the filter response to attenuate bad bins. An example of reducing power to a bad bin by a scale factor would be to multiply the carrier in the frequency domain by 0.10. By reducing the transmit power associated with a bad bin, less power is used when there is no possibility of data being transmitted. This is an advantage over the proposed prior art methods which specify transmit power being maintained on all bins or transmits a small amount of data on marginal bins.

Next, at step 306, the power on the marginal bins is increased. Generally, the power on the marginal bins will be increased by an amount made available by reducing the bad bins' power, thereby resulting in no change in the overall system power. In one embodiment, the available power would be used to evenly gain all marginal bins. In another example, the available power could be allocated to any marginal bin based on the SNR for each bin. In yet another embodiment, the available power would added to the marginal bins capable of providing the greatest increase in bit capacity for the allocated power.

Next, at step 320, a determination is made for each marginal bin having an increased power level, whether the power increase results in the marginal bin becoming a good bin. This determination can be estimated, or determined by a channel analysis on the marginal bins, to determine if the SNR value following an increase in transmit power is sufficient to support data transfer. When a marginal bin is improved, and determined to be a good bin, flow proceeds to step 307, and the newly identified good bin is so identified. When a marginal bin's power is increased, and determined to still be marginal, flow proceeds to step 308. At step 308 the bin is identified as a bad bin, and the flow proceeds to step 305, where the newly identified bad bin has its power reduced. It should be noted, that it would be possible to maintain the marginal status of the bin at step 308, and attempt to increase the power even more to create a good bin. However, at least some of the marginal bins would need to be identified as bad bins in order to free-up extra power for allocation which would then be used to improve the SNR of a marginal bin, instead of identifying it as bad at step 308. Next, at step 309, data is transmitted on all bins defined as good bins.

The flow of FIG. 3 provides an improvement over the proposed prior art by not maintaining a constant power level to a bad bin. In addition, the prior art does not allow substantially increasing the power in good or marginal bins to improve data rate performance. The present invention allows maximizing the data rate in cases where the signal strength would otherwise be attenuated to the point where no useful data can be transmitted and received on at least some bins.

Figure 4:
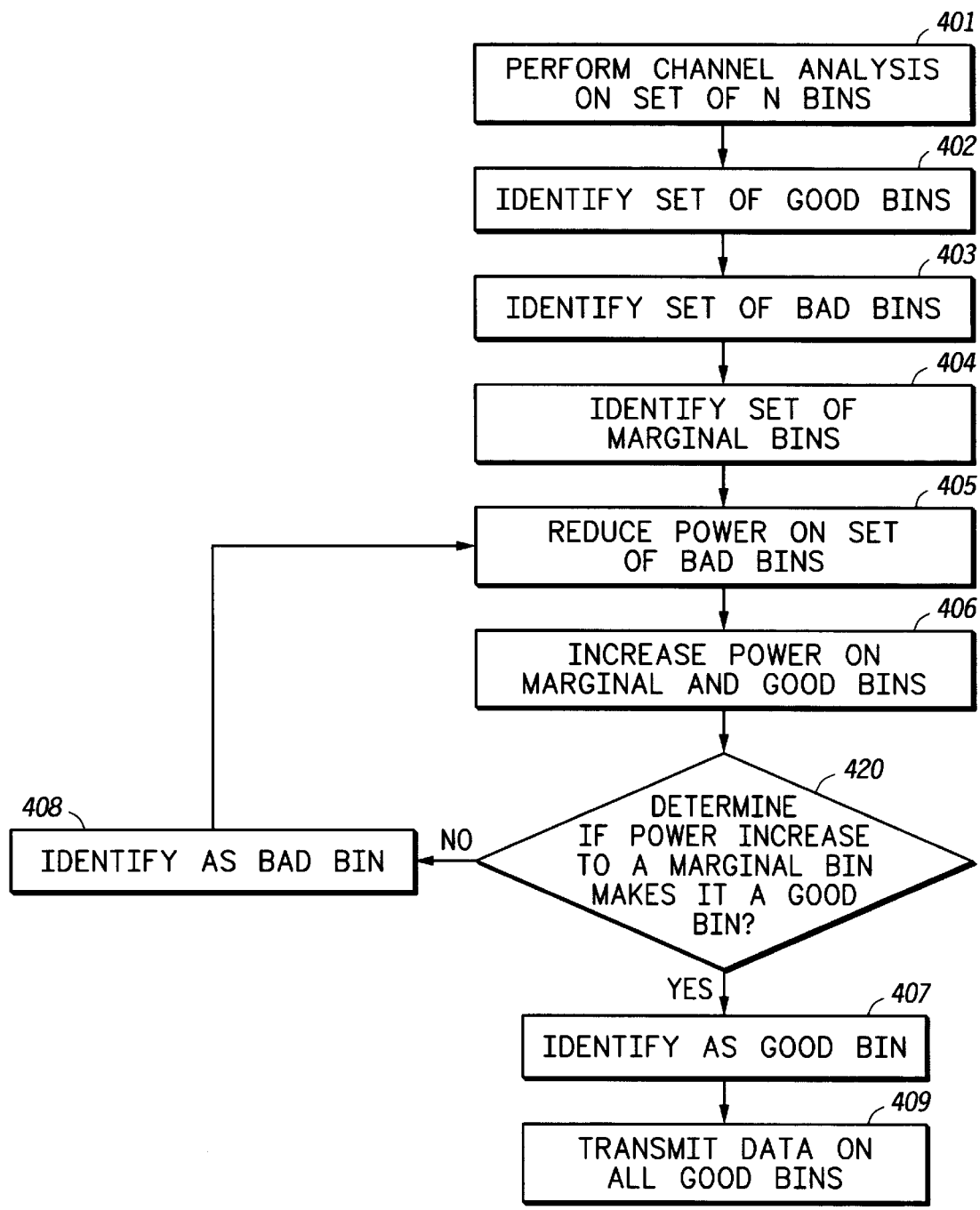

FIG. 4 illustrates another method in accordance with the present invention. Steps 401 through 404 are analogous to steps 301 through 304 of FIG. 3, and will not be discussed further. Next, at step 406, the power on the marginal and good bins will be increased. In this embodiment, not just the marginal bins' power is increased. This allows for an increased bit allocation to good bins and marginal bins alike. The steps 420, 407, 408 and 409 are analogous to steps 320, 307, 308 and 309 of FIG. 3, and will not be discussed further herein.

Figure 5:
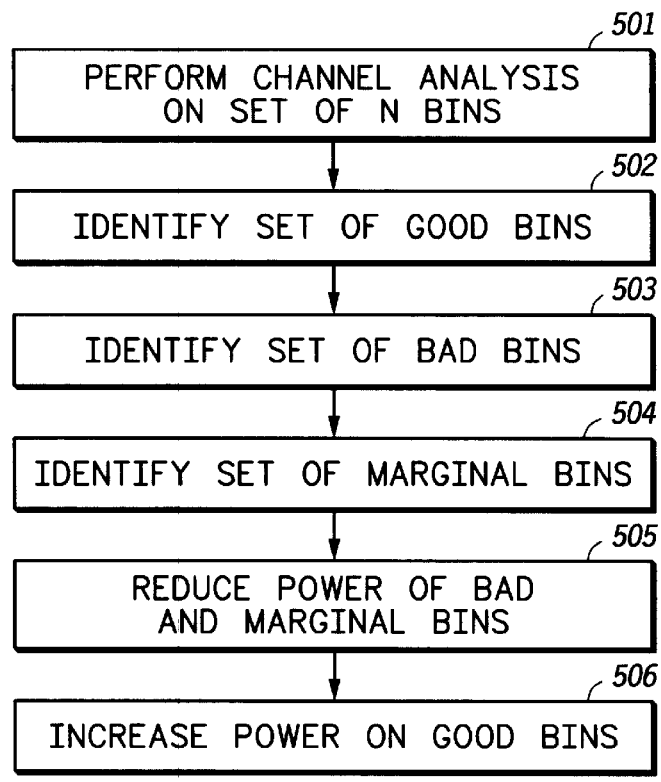

FIG. 5 illustrates another method in accordance with the present invention. Steps 501 through 504 are analogous to steps 301 through 304 of FIG. 3, and will not be discussed further. Next, at step 505, the power on the marginal and bad bins is reduced. Next, at step 506, the power on the just the good bins is increased. In this embodiment, all available power from the bad and marginal bins is reallocated to the good bins. This allows for an increased bit allocation to good bins. In general, the power would not be increased beyond the amount needed to transmit the maximum data capacity of each bin at a specific BER.

Figure 6:
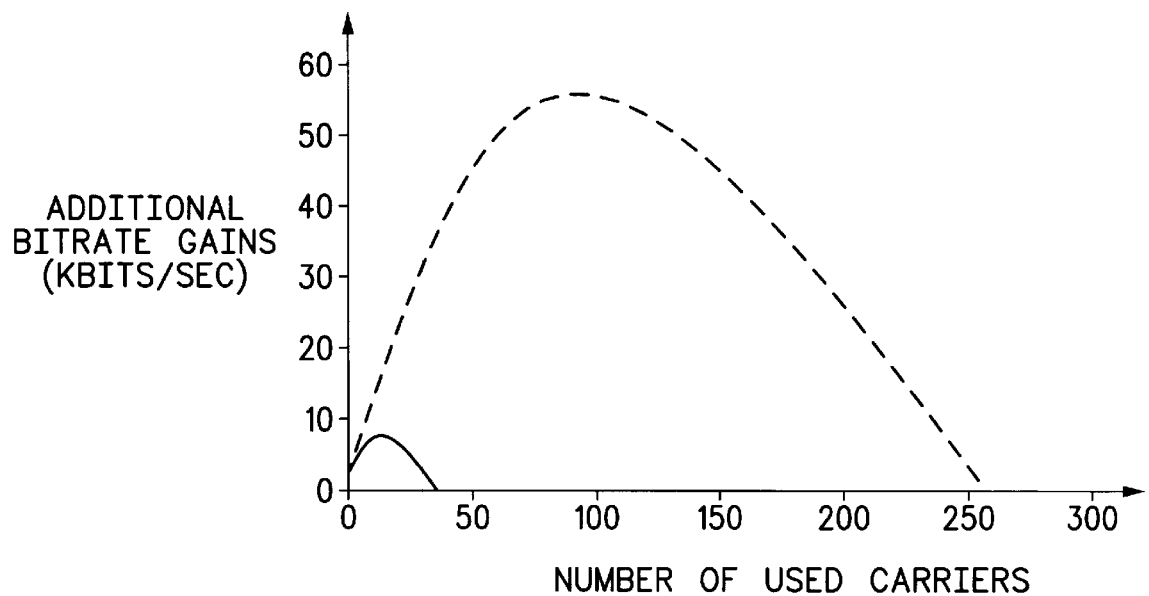
FIG. 6, illustrates a graph of increased bit rate versus the number of used carriers.

The increase in bit rate using the present invention is illustrated in FIG. 6. FIG. 6 illustrates the bit rate gain observed by the inventors when the power associated with unused carriers is reallocated. Note, that when all 250 carriers are used there is no power to be reallocated and, therefore, no increase in overall data rate. However, when only 100 carriers were used in the system tested, and the power from the 150 unused carriers was reallocated to the used bins, an increased bit rate of approximately 550 kilobits per second was realized. Therefore, it should be recognized that by reallocating the power associated with an ADSL system provides a performance improvement over the prior art standard. The use of the present invention would allow for signals to be transmitted greater distances by reallocating power to the bins that are capable of carrying signals over the additional distance. This is an advantage over the prior art which does not allow for such power reallocation.

In the foregoing specification, the invention has been described with reference to specific embodiments. However, one of ordinary skill in the art will appreciate that various modifications and changes can be made to the present invention without departing from the scope of the present invention as set forth in the claims below. For example, the specific embodiment has been discussed in terms of using the SNRref table of FIG. 2 to determine if a bin is good, bad, or marginal. One skilled in the art would appreciate that the invention is equally applicable where other methods of classifying bins are used. Another example of a modification would be to periodically transmit power on some or all of the unused bins in order to monitor the SNR of the bin. In addition, a combination of the methods described could be used. In the claims, means-plus-function clause(s), if any, cover the structures described herein that perform the recited function(s). The mean-plus-function clause(s) also cover structural equivalents and equivalent structures that perform the recited function(s).

We claim:

1. A method for optimizing a data rate of a Discrete Multi-Tone communication system, the method comprising:
   performing a channel analysis on a plurality of bins;
   identifying a bad bin, wherein a bad bin is one of the plurality of bins that does not meet a predefined performance criterion wherein the predefined performance criterion defines whether any data can be transmitted using the bad bin;
   specifying a reduced power to be transmitted over the bad bin; and
   specifying an increased power to be transmitted over at least one of the plurality of bins that is not the bad bin.

2. The method of claim 1, wherein the step of identifying a bad bin includes:
   identifying a bin as a bad bin when a signal to noise ratio of the bin is below a predefined value.

3. The method of claim 1, wherein the step of identifying a bad bin includes:
   identifying a bin as a bad bin when a predefined data rate is not capable of being maintained at a specified error rate.

4. The method of claim 1, wherein the step of specifying a reduced power includes specifying a fixed amount by which to reduce power to the bad bin.

5. The method of claim 1, wherein the step of specifying a reduced power includes reducing power to the bad bin by a ratio relative to the power allocated to other bins of the plurality of bins.

6. The method of claim 1, wherein the step of specifying an increased power includes specifying a fixed amount by which to increase power to the at least one of the plurality of bins that is not the bad bin.

7. The method of claim 1, wherein the step of specifying an increased power includes increasing power to the at least one of the plurality of bins that is not the bad bin by a ratio relative to the power allocated to other bins of the plurality of bins.

8. The method of claim 1, wherein the step of specifying an increased power includes increasing power to the at least one of the plurality of bins by an amount to maintain a power level associated with the plurality of bins.

9. A method for optimizing a data rate of a Discrete Multi-Tone communication system, the method comprising:
   performing a channel analysis on a plurality of bins;
   identifying a bad bin, wherein a bad bin is one of the plurality of bins that does not meet a first predefined performance criterion wherein the first predefined performance criterion defines whether any data can be transmitted using the bad bin;
   identifying a good bin, wherein a good bin is one of the plurality of bins that meets a second predefined performance criterion;
   reducing a transmit power to the bad bin by a first power amount; and
   increasing a transmit power to the good bin by a second power amount.

10. The method of claim 9, wherein the step of identifying a good bin further comprises the second predefined performance criterion being substantially equivalent to the first predefined performance criterion.

11. The method of claim 9, wherein the step of increasing a transmit power to the good bin comprises increasing a transmit power to the good bin by a second power amount, wherein the second power amount is substantially similar to the first power amount.

12. The method of claim 9, further comprising the step of:
   determining if the good bin capable of transmitting an additional bit of data following the step of increasing the transmit power to the good bin.

13. The method of claim 9, further comprising the step of:
   allocating an additional bit of data to the good bin following the step of increasing the transmit power to the good bin.

14. A method for optimizing a data rate of a Discrete Multi-Tone communication system having a plurality of bins, the method comprising:
   identifying a bad bin, wherein a bad bin is one of the plurality of bins that does not meet a first predefined performance criterion;
   identifying a first good bin, wherein the first good bin is one of the plurality of bins that meets a second predefined performance criterion;
   identifying a marginal bin, wherein a marginal bin is one of the plurality of bins that meets a third predefined performance criterion;
   reducing a transmit power to the bad bin by a first power amount;
   increasing a transmit power to the marginal bin by a second power amount;

identifying the marginal bin as a second good bin in response to the step of increasing; and transmitting data on the first good bin and the second good bin.

15. The method of claim 14, wherein the step of identifying a marginal bin further comprises identifying the marginal bin, wherein the third predefined performance criterion is mutually exclusive of the first predefined performance criteria and the second predefined performance criterion.

16. The method of claim 14, wherein the step of increasing includes increasing the transmit power to the marginal bin by the second power amount, wherein the second power amount is equal to the first power amount.

17. The method of claim 14 further comprising the step of:

increasing the transmit power to the good bin by a third power amount.

18. The method of claim 17, wherein the step of increasing the transmit power to the good bin includes increasing the power by the third power amount, wherein the third power amount and the second power amount are substantially similar.

19. The method of claim 17, wherein the step of increasing the transmit power to the good bin includes increasing the power by the third power amount, wherein the third power amount and the second power amount are scaled relative to a scaling factor.

20. The method of claim 19, wherein the step of increasing the transmit power to the good bin includes increasing the power by the third power amount, wherein the scaling factor is based upon a number of bits the good bin and the bad bin have allocated to them.

21. The method of claim 14, wherein the step of identifying the marginal bin as the second good bin further comprises the step of:

determining if the marginal bin is capable of transmitting an additional bit of data following the step of increasing the transmit power to the marginal bin.

22. The method of claim 14, further comprising the step of:

allocating an additional bit of data to the marginal bin following the step of increasing the transmit power to the marginal bin.

23. The method of claim 14 wherein the step of identifying a marginal bin comprises the step of identifying a bin that has a bit carrying capability of one bit for a predetermined bit error rate.

24. The method of claim 23 wherein the step of identifying the marginal bin as a second good bin comprises the step of identifying that the marginal bin has a bit carrying capability of at least two bits for the predetermined bit error rate after the step of increasing the transmit power to the marginal bin.

* * * * *